United States Patent [19]

Bennett

[11] 3,957,843

[45] May 18, 1976

[54] NON-ISOMERIZABLE OLEFINIC POLYOXYALKYLENE POLYMERS AND SILOXANE-POLYOXYALKYLENE COPOLYMER DERIVATIVES THEREOF

[75] Inventor: Everett W. Bennett, Longmeadow, Mass.

[73] Assignee: Union Carbide Corporation, New York, N.Y.

[22] Filed: Mar. 30, 1971

[21] Appl. No.: 129,562

[52] U.S. Cl................ 260/448.2 B; 260/448.2 E; 260/2.5 AH
[51] Int. Cl.$^2$........................................... C07F 7/08
[58] Field of Search .............................. 260/448.2 B

[56] References Cited
UNITED STATES PATENTS

| | | | |
|---|---|---|---|
| 3,280,160 | 10/1966 | Bailey............................ | 260/448.2 B |
| 3,402,192 | 9/1968 | Haluska.......................... | 260/448.2 B |
| 3,427,271 | 2/1969 | McKellar................... | 260/448.2 B X |
| 3,505,377 | 4/1970 | Morehouse................... | 260/448.2 B |
| 3,595,894 | 7/1971 | Brown et al.................. | 260/448.2 B |
| R25,727 | 2/1965 | Haluska........................ | 260/448.2 B |

*Primary Examiner*—Paul F. Shaver
*Attorney, Agent, or Firm*—Eugene C. Trautlein

[57] ABSTRACT

This invention relates to novel polyoxyalkylene polymers characterized by olefinic endblocking groups in which the olefinic double bond is in the alpha position and is incapable of isomerizing or shifting to the beta or any other position. The novel polymers readily undergo addition reactions with siloxanes containing SiH to produce novel siloxane-polyoxyalkylene block copolymers that are useful as foam stabilizers for polyurethane foams. The olefinic double bonds undergo little side reactions during such addition reactions and so the product is relatively free of materials other than the block copolymer.

11 Claims, No Drawings

NON-ISOMERIZABLE OLEFINIC POLYOXYALKYLENE POLYMERS AND SILOXANE-POLYOXYALKYLENE COPOLYMER DERIVATIVES THEREOF

Siloxane-polyoxyalkylene block copolymers have found wide acceptance as foam stabilizers in the production of polyurethane foams. A particularly useful class of such block copolymers are those in which the blocks are linked by hydrolytically stable silicon-carbon bonds derived from the addition reaction of a siloxane containing silanic hydogen(s) with a linear polyoxyalkylene polymer (polyether) whose linear chain is endblocked at one end by an alkenyl group (e.g., allyl group) and at the other end by a hydroxyl group, an alkoxy group or an acyloxy group. Polyoxyalkylene polymers wherein the alkenyl groups are vinyl or allyl groups are used almost exclusively in that reaction. The use of vinyl endblocked polyoxyalkylene reactants in producing the above described block copolymers is beset by various problems such as the tendency of the vinyl group to react with any alcoholic hydroxyls in the reaction mixture to form acetals and the tendency of the vinyl group to undergo vinyl type polymerization. The use of allyl endblocked oxyalkylene polymers in such a reaction also presents some practical problems. Some of the allyl groups ($CH_2=CH-CH_2-$) undergo undesirable isomerization during the addition reaction to form propenyl groups ($CH_3-CH=CH-$) which are much less reactive toward silanic hydrogen. To insure complete reaction of SiH, excess polyoxyalkylene reactant can be added to compensate for the propenyl formation. However, it is not practicable to separate the unreacted excess polyoxyalkylene reactant from the block copolymer producct. The presence of such unreacted polyoxyalkylene reactant in the end product imposes a ceiling on the concentration of the block copolymer in the product. Further, propenyl groups can enter into undesirable side reactions, such as SiH addition to propenyl to form thermally less stable beta adducts, and acetal formation between propenyl and any hydroxyl endblocking groups in the polyoxyalkylene reactant.

It is an object of this invention to provide novel polyoxyalkylene polymers endblocked with olefinically unsaturated groups in which the olefinic double bond is reactive with SiH, is incapable of isomerizing during such addition reactions, and undergoes little, if any, side reactions during such addition reactions.

Further objects of this invention are to provide novel siloxane — polyoxyalkylene block copolymers derived from the above-mentioned novel polyoxyalkylene polymers, to provide a novel process for producing such block copolymers, and to provide a process for producing polyurethane foams employing the novel block copolymers as foam stabilizers.

This invention provides novel olefinic polyoxyalkylene polymers having the average formula:

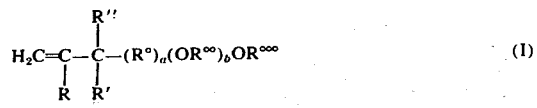

(I)

wherein R is hydrogen or a monovalent hydrocarbon group free of aliphatic carbon to carbon multiple bonds, R' and R'' are each monovalent hydrocarbon groups free of aliphatic carbon to carbon multiple bonds, R° is a divalent hydrocarbon group free of aliphatic carbon to carbon multiple bonds, $a$ has a value of 0 or 1, R°° is an alkylene group containing at least two carbon atoms, $b$ has a value of at least 5 and R°°° is —R, —OCNHR, —OCR' or —OCOR' (where R and R' are as defined above).

This invention further provides novel siloxanepolyoxyalkylene block copolymers consisting essentially of:

a. at least one unit having the formula:

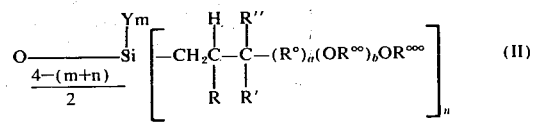

(II)

wherein Y is a monovalent hydrocarbon group free of aliphatic carbon to carbon multiple bonds, $m$ has a value from 0 to 2 inclusive, $n$ has a value from 1 to 3 inclusive, ($m+n$) has a value from 1 to 3 inclusive and the remaining symbols are as defined above; and b. units having the formula:

$$Z_pSiO_{4-p/2}$$ (III)

wherein $p$ has a value from 1 to 3 inclusive and Z is a monovalent hydrocarbon group free of aliphatic carbon to carbon multiple bonds. Preferably such copolymers contain from 1 to 25 mole-% of units represented by formula (II) and from 25 to 99 mole-% of units represented by formula (III).

This invention still further provides a process for producing block copolymers as defined above which process comprises reacting (1) an olefinic polyoxyalkylene polymer represented by formula (I); with (2) a hydrosiloxane consisting essentially of:

a. at least one unit having the formula:

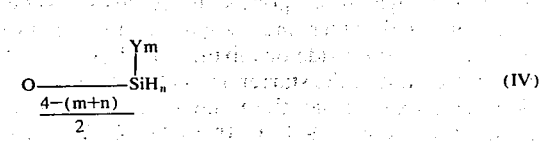

(IV)

wherein $m$, $n$, ($m+n$) and Y are as defined above; and b. units having formula (III) above in the presence of (3) a catalyst for the addition of SiH to olefinic bonds.

The invention also provides a process for producing a polyurethane foam by simultaneously reacting and foaming a mixture of (a) a polyester or a polyether containing at least two hydroxyl groups, (b) an organic polyisocyanate, (c) a catalyst for the reaction of (a) and (b) to produce the polyurethane, (d) a blowing agent and (e) a novel siloxane-polyoxyalkylene block copolymer as described above as an foam stabilier.

Typical of the monovalent hydrocarbon groups free of aliphatic carbon to carbon multiple bonds represented by Y, R, R', R'' and Z in formulas (I), (II) and (III) above are the alkyl groups (for example, the methyl, ethyl, n-propyl, iso-propyl, n-butyl, sec-butyl, isobutyl, tL-butyl, n-octyl, decyl, dodecyl groups), the cycloalkyl groups (for example, the cyclopropyl, cyclobutyl, cyclopentyl, cyclohexyl, cycloheptyl groups), the aryl groups (for example, the phenyl, naphthyl, phenathrenyl, anthracenyl groups), the aralkyl groups (for example, the benzyl, 2-phenylethyl, 2-phenyl propyl, cumyl groups, the alkaryl groups (for example, the toyl, t-butylphenyl, cyclohexylphenyl groups). Typical of the alkylene groups represented by $R^{\infty}$ in formulas (I) and (II) above are ethylene, propylene, 1,2- and 1,3-propylene and butylene. Typical of the divalent hydrocarbon groups represented by $R°$ in formulas (I) and (II) above are the methylene, phenylene and $R^{\infty}$ groups.

A preferred class of the block copolymers as defined above have the average formula:

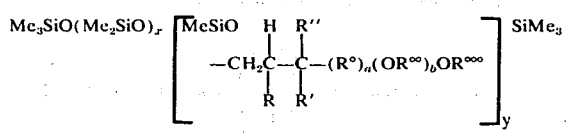

(V)

wherein Me is a methyl group, $x$ has a value from 10 to 100, $y$ has a value from 1 to 15 and the remaining symbols are defined above.

The olefinic polyoxyalkylene polymers represented by formula (I) above can be produced by reacting a suitable olefinic alcohol with an alkylene oxide. Suitable olefinic alcohols are those represented by the formula:

(VI)

wherein the symbols are as defined for formula (I). Suitable alkylene oxides include ethylene oxide, 1,2-propylene oxide, 1,3-propylene oxide, 1,2-butylene oxide and the like and mixtures thereof.

In general, the olefinic alcohol (starter) preferably is placed in an autoclave or other high-pressure vessel along with catalytic amounts of a suitable catalyst, such as, sodium hydroxide, potassium hydroxide, other alkali metal hydroxides and sodium or other alkali metals. The alkylene oxide or mixture of alkylene oxides is then injected into the starter and catalyst and, the reaction being exothermic, the temperature increases, and preferably is controlled at 70° to 110°C. Because the alkylene oxides are normally gaseous materials, pressure is controlled preferably at 50 to 70 psig. The alkylene oxide or mixture thereof is preferably injected over a period of time until the olefinic polyoxyalkylene polymer of the desired average molecular size is obtained. The rate of injection can be regulated to control the pressure and temperature within the autoclave.

When it is desired to produce an olefinic polyoxyalkylene polymer having two or more different types of oxyalkylene units in random distribution, the respective alkylene oxides are either first mixed and then injected or are separately injected simultaneously. When it is desired to produce an olefinic polyoxyalkylene polymer having blocks of different oxyalkylene units, one alkylene oxide is injected to produce a block of a desired size and then the other alkylene oxide is injected to produce its block of the desired size. This procedure can be repeated to produce more than two such blocks, as desired.

The proportions of starter and alkylene oxide used can be varied, as desired, to produce olefinic polyoxyalkylene polymers of the desired average molecular weight. The resulting compositions comprise mixtures of polyoxyalkylene polymers containing different amounts of combined alkylene oxide and thus having different molecular weights from molecule to molecule. Formulas of polyoxyalkylene polymers given herein represent average compositions.

The olefinic alcohol-alkylene oxide reaction produces a hydroxyl endblocked polyoxyalkylene polymer [i.e., $OR^{\infty\infty\infty}$ in formula (I) is hydroxyl]. When it is desired to produce a polymer represented by formula (I) wherein $OR^{\infty\infty\infty}$ is hydrocarbonoxy, OOCNHR,

OOCR' or OOCOR', the hydroxy endblocked polymer can be converted to such endblockers ("capped") by conventional means (e.g., by reaction with OCNR to produce OOCNHR endblockers).

Typical of the olefinic alcohols represented by formula (VI) above are the following:

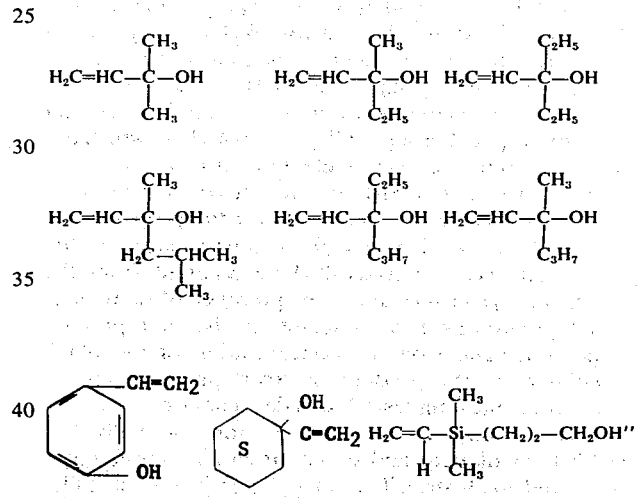

The hydrosiloxane reactants used to produce the siloxane-polyoxyalkylene block copolymers of this invention can be produced by cohydrolyzing and cocondensing the appropriate hydrolyzable silanes or by equilibrating appropriate siloxanes using conventional techniques. Such hydrosiloxanes consist essentially of at least one unit having the formula:

wherein $m$, $n$, $(m+n)$ and Y have the above-defined meanings and units represented by formula (III) above.

The process for producing the block copolymers of this invention is conducted in the same manner as used in producing known siloxane-polyoxyalkylene block copolymers in addition reactions (i.e., at elevated temperatures and in the presence of a platinum catalyst). Approximately stoichiometric amounts of the olefinic polyoxyalkylene polymer and the hydrosiloxane (one olefinic group per SiH group) can be employed. Solvents for the polyoxyalkylene reactant and hydrosiloxane reactants (e.g. liquid hydrocarbons such as toluene) can be employed. Amounts of platinum catalysts that provide from 10 to 50 parts by weight per million parts by weight of the reactants are useful. Suitable reaction temperatures are from 80°C. to 100°C. Suitable addition catalysts include chloroplatinic acid and complexes thereof and elemental platinum supported on charcoal or gamma alumina.

The organic polyisocyanates that are useful in producing polyurethane foams in accordance with this invention are organic compounds that contain at least two isocyanato groups. Such compounds are well known in the art of producing polyurethane foams. Suitable organic polyisocyanates include the hydrocarbon diisocyanates, (e.g., the alkylene diisocyanates and the arylene diisocyanates as well as known triisocyanates. As examples of suitable polyisocyanates one can mention 1,2-diisocyanatoethane, 1,3-diisocyanatopropane, 1,2-diisocyanatopropane, 1,4-diisocyanatobutane, 1,5-diisocyanatopentane, 1,6-diisocyanatohexane, bis(3-isocyanatopropyl)ether, bis(3-isocyanatopropyl)sulfide, 1,7-diisocyanatoheptane, 1,5-diisocyanato-2,2-dimethylpentane, 1,6-diisocyanato-3-methoxyhexane, 1,8-diisocyanatooctane, 1,5-diisocyanato-2,2,4-trimethylpentane, 1,9-diisocyanatononane, 1,10-diisocyanatopropyl)ether of 1,4-butylene glycol, 1,11-diisocyanatoundecane, 1,12-diisocyanatododecane, bis(isocyanatohexyl)sulfide, 1,4-diisocyanatobenzene, 2,4-diisocyanatotoluene, 2,6-diisocyanato tolylene, 1,3-diisocyanato-o-oxylene, 1,3-diisocyanato-m-xylene, 1,3-diisocyanato-p-xylene, 2,4-diisocyanato-1-chlorobenzene, 2,4-diisocyanato-1-nitrobenzene, and 2,5-diisocyanato-1-nitrobenzene.

The polyesters that are useful in producing polyurethane foams in accordance with this invention are the reaction products of polyfunctional organic carboxylic acids and polyhydric alcohols. The polyesters contain at least two hydroxyl groups per molecule (as alcoholic OH or as OH in COOH groups). The functionality of these acids is preferably provided by carboxy groups (COOH) or by both carboxy groups and alcoholic hydroxyl groups. The polyesters can have hydroxyl numbers from 45 to 150 but preferably have hydroxyl numbers from 45 to 65. These hydroxyl numbers are readily determined according to the procedure described by Mitchel et al, ORGANIC ANALYSIS, Volume I, Interscience, New York, 1953. The polyesters can be free of aliphatic carbon to carbon multiple bonds (i.e., olefinic double bonds or acetylenic triple bonds).

Typical of the polyfunctional organic carboxylic acids that can be employed in producing polyesters useful in this invention are dicarboxylic aliphatic acids such as succinic, adipic, sebacic, azelaic, glutaric, pimelic, maleic, malonic and suberic acids and aromatic dicarboxylic acids such as phthalic acid, terephthalic acid, isophthalic acid and the like. Other polycarboxylic acids that can be employed are the "dimer acids" such as the dimer of linoleic acid. Hydroxyl-containing monocarboxylic acids (such as ricinoleic acid) can also be used. Alternatively, the anhydrides of any of these various acids can be employed in producing the polyesters. Typical of the polyhydric alcohols that can be employed in producing the polyesters useful in this invention are glycerol, 1,2,6-hexanetriol, ethylene glycol, diethylene glycol, trimethylol propane, trimethylolethane, pentaerythritol, sorbitol, propylene glycol, 1,3-butylene glycol and 1,4-butylene glycol.

The polyethers that are useful in producing polyurethane foam in accordance with this invention are exemplified by the following classes of compositions:

a. Polyoxyalkylene polyols including alkylene oxide adducts of, for example, water, ethylene glycol, diethylene glycol, propylene glycol, dipropylene glycol, glycerol, 1,2,6-hexanetriol, 1,1,1-trimethylolethane, 1,1,1-trimethylolpropane, pentaerythritol, sorbitol, sucrose, lactose, alpha-methylglucoside, alpha-hydroxyalkylglucoside, ammonia, triethanolamine, triisopropanolamine, ethylenediamine, diethylenetriamine, novolac resins, phosphoric acid, benzenephosphoric acid, polyphosphoric acids such as tripolyphosphoric acid and tetrapolyphosphoric acid, phenol-aniline-formaldehyde ternary condensation products, aniline-formaldehyde condensation products, and the like, are useful. The alkylene oxides employed in producing polyoxyalkylene polyols normally have from 2 to 4 carbon atoms. Propylene oxide and mixtures of propylene oxide with ethylene oxide are preferred.

b. Polyesters of polyhydric alcohols and polycarboxylic acid such as those prepared from an excess of ethylene glycol, propylene glycol, 1,1,1-trimethylolpropane, glycerol, or the like reacted with phthalic acid, adipic acid, and the like, are useful polyols.

c. Lactone polyols prepared by reacting a lactone such as epsilon-caprolactone or a mixture of epsilon-caprolactone and an alkylene oxide with a polyfunctional initiator such as a polyhydric alcohol, an amine, or an amino-alcohol, are also useful.

d. Phosphorus-containing derivatives such as tris(dipropylene) glycol phosphite and other phosphites are useful in polyurethane foams.

The foregoing are merely illustrative of the many polyols that are employed in producing the polyurethane foams of the invention.

The polyol or polyol mixture employed can have hydroxyl numbers which vary over a wide range. In general, the hydroxyl number of the polyols employed in the invention can range from about 20, and lower, to about 1000, and higher, preferably from about 30 to about 800, and more preferably, from about 35 to about 700. The hydroxyl number is defined as the number of milligrams of potassium hydroxide required for the complete neutralization of the hydrolysis product of the fully acetylated derivative prepared from 1 gram of polyol. The hydroxyl number can also be defined by the equation:

$$OH = \frac{56.1 \times 1000 \times f}{m.w.}$$

where
 OH = hydroxyl number of the polyol
 $f$ = average functionality, that is, average number of hydroxyl groups per molecule of polyol
 m.w. = average molecular weight of the polyol.

The exact polyol employed depends upon the end-use of the polyurethane foam. The molecular weight and the hydroxyl number are selected properly to result in flexible, semi-flexible, or rigid foams. The polyol preferably possesses a hydroxyl number of from about 200 to about 1000 when employed in rigid foam formulations, from about 50 to about 250 for semi-flexible foams, and from about 20 to about 70 or more when employed in flexible foam formulations. Such limits are not intended to be restrictive, but are merely illustrative of the large number of possible combinations of the polyols that can be employed.

Forming can be accomplished by employing a small amount of a polyurethane blowing agent, such as water, in the reaction mixture (for example, from about 0.5 to about 5 weight per cent of water, based on total weight of the reaction mixture), or through the use of blowing agents which are vaporized by the exotherm of the reaction, or by a combination of the two methods. All of these methods are known in the art. Illustrative polyurethane blowing agents include halogenated hydrocarbons such as trichloromonofluoromethane, dichlorodifluoromethane, dichloromonofluoromethane, dichloromethane, trichloromethane, 1,1-dichloro-1-fluoroethane, 1,1,2-trichloro-1,2,2-trifluoromethane, hexafluorocyclobutane, octafluorocyclobutane, and the like. Another class of blowing agents include thermally-unstable thermally-unstaable compounds which liberate gases upon heating, such as N,N'-dimethyl-N,N'-dinitrosoterephthalamide, and the like. The generally preferred method of foaming for producing flexible foams is the use of water or a combination of water plus a fluorocarbon blowing agent such as trichloromonofluoromethane. The quantity of blowing agent employed will vary with factors such as the density desired in the foamed product.

The catalysts ordinarily employed for accelerating the isocyanate-reactive hydrogen reaction can be employed in the process of this invention. Such catalysts include a wide variety of compounds such as, for example: tertiary amines such as N,N-dimethyl-2-[2-dimethylaminoethoxy]ethylamine, trimethylamine, N-methylmorpholine, N-ethylmorpholine, N,N-dimethylbenzylamine, N,N-diemthylethanolamine, N,N,N',N'-tetramethyl-1,3-butanediamine, triethanolamine, 1,4-diazabicyclo-[2,2,2]octane, triethylene diamine, bis(-dimethylaminoethyl)ether, hexadecyldimethylamine, and the like. Metal-containing catalysts are not preferred when polyester polyols are used but are preferred when polyether polyols are used. Such matal catalysts include stannous octoate and dibutyl tin dilaurate. The catalysts are employed in small amounts, for example, from about 0.001 weight per cent to about 5 weight per cent, based on weight of the reaction mixture.

The relative amounts of the various components used in the process of this invention are not narrowly critical. The polyester or polyether polyol and the polyisocyanate, taken together, are present in the foam formulations (reaction mixtures) used to produce such foams in a major amount. The relative amounts of these two components is the amount required to produce the urethane structure of the foam and such relative amounts are well known in the art. The blowing agent, catalyst and block copolymer are each present in the known amount necessary to achieve the function of the component. Thus, the blowing agent is present in a minor amount sufficient to foam the reaction mixture, the catalyst is present in a catalytic amount (i.e., an amount sufficient to catalyze the reaction to produce the urethane at a reasonable rate) and the block copolymer is present in a foam-stabilizing amount (i.e., in an amount suficient to stabilize the foam). Thus the amount of the siloxane-polyoxyalkylene block copolymer employed as a foam stabilizer in this invention can vary over wide limits. From about 0.2 weight per cent to 5 weight per cent or greater of the block copolymer can be used (weight percentages are based on the total weight of the mixture, that is, the polyether or polyester polyol, polyisocyanate, catalyst, blowing agent and foam stabilizer).

Additional conventional ingredients can be employed in minor amounts in producing polyurethane foams in accordance with the process of this invention if desired for specific purposes.

In accordance with this invention, polyurethane foams are produced by the conventional procedures such as the one-step or one-shot technique wherein all of the reactants are reacted simultaneously with the foaming operation. The foaming and the urethane-foaming reaction in the one-step technique occur without the application of external heat. Thereafter, the foam can be heated (further cured) at 110°F. to 140°F. for 10 to 40 minutes to elimiate any surface tackiness if desired.

The polyurethane foams produced in accordance with this invention can be used in the same areas and for the same purposes as conventional polyester or polyether polyurethane foams (e.g., they can be used as textile interliners, cushioning materials for seating and for packaging delicate objects, and gasketing material).

In view of the fact that the olefinic double bonds in the olefinic polyoxyalkylene polymers of this invention do not isomerize during the reaction with hydrosiloxanes and do not undergo significant side reactions, the resulting product contains are relatively high proportion of the desired copolymer. Consequently, a smaller amount of the product can be employed to achieve a given level of performance (e.g., the block copolymers are more "potent" polyurethane foam stabilizers).

In the above formulas, the symbols representing the numbers and types of groups need not have the same meaning at each occurrence throughout the composition. For example, in a given block copolymer having groups represented by formula (III) above, some of such groups can be dimethylsiloxane groups while other of such groups can be diethylsiloxane groups and/or trimethylsiloxane groups.

The term "block copolymer" is used herein to denote a material wherein at least one section ("block") of the molecule is composed of recurring monomeric units of one type and at least one other section ("block") of the molecule composed of recurring monomeric units of a different type. The different sections of blocks in the molecule can be arranged in any configuration (e.g., AB, ABA, branched or cyclic). Thus the term block copolymers as used herein includes graft copolymers. The block copolymrs used in this invention can be discrete chemical compounds. Usually, however, the block copolymers are mixtures of various discrete block copolymer species. The block copolymers are usually mixtures due, at least in part, to the fact that the siloxane and polyoxyalkylene reactants used to produce the block copolymers are themselves usually mixtures.

The following Examples illustrate the present invention.

In the following Examples the abbreviations and symbols used have the indicated meanings.

| g. | grams |
|---|---|
| Me | methyl |
| % | percent by weight |
| ml. | milliliter |
| Polyol I | a polyol produced from glycerol and a mixture of 86 weight percent propylene oxide and 14 weight percent ethylene oxide. Polyol I has a hydroxyl number of 46. |
| TDI | A mixture of 80 weight-% 2,4-tolylene diisocylanate and 20 weight-% 2,6-tolylene diisocyanate. |
| psig. | pounds per square inch guage pressure |
| lbs. | pounds |
| gal. | gallon |
| MW | molecular weight |
| min. | minute |

EXAMPLE 1

A. 2-Methyl-3-buten-2-ol (251 g.) and flake potassium hydroxide (2.2 g.) were charged to a 2-gallon stainless steel reactor equipped with a circulating pump. The reactor was purged with nitrogen and 1420 ml (1205 g.) of a mixture of 35 wt-% ethylene oxide and 65 wt-% propylene oxide was gradually fed to the reactor over a period of 6 hours under pressure (60 psig) and a temperature of 104°–107°C while the contents were circulated with the pump. The reaction was continued for additional 6 hours. To 800 g. of the product prepared above was added 8.0 g. of flake potassium hydroxide and 4700 ml of the 35/65 wt-% mixture of alkylene oxides was then added slowly over 9 hours. The reaction was carried out at 110°C and at 60 psig for 3 hours after addition had been completed. The hydroxyl number of the crude product was 24.3 corresponding to an average molecular weight of 2,300. Further addition of the 35/65 wt-% mixture of alkylene oxides was necessary to achieve the target molecular weight of 2,600 (hydroxyl number 21.5). The product was refined by stripping (volatilization of volatile materials) followed by treatment with magnesium silicate to yield a gamma, gamma-dimethylallyl endblocked polyoxyalkylene polymer which analyzed by weight 1.07% unsaturation (as $C_3H_5$), 0.68% hydroxyl, cloud point of 40°C. and viscosity 688 centistokes.

B. 500 g. of a gamma, gamma-dimethylallyl endblocked polyoxyalkylene polymer produced as described in part A of this Example was reacted with 58.5 g. of a 25 weight percent solution of sodium methylate in methanol at 55° to 65°C. in accordance with the equation:

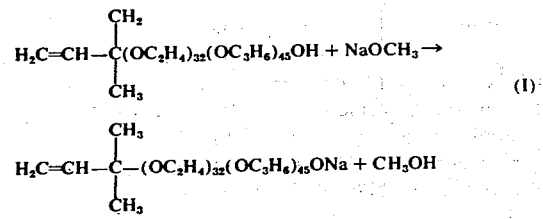

(I)

The sodium salt of the polyoxyalkylene polymer was formed while distilling the ethanol by-product from the reaction mixture with nitrogen sparge.

C. The sodium salt produced in B was then reacted with an excess of methyl chloride in accordance with the equation:

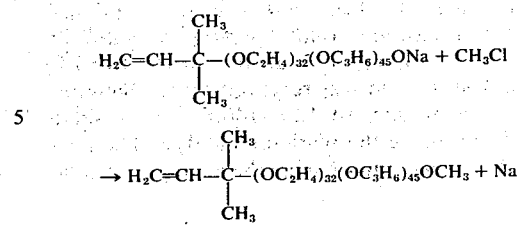

To the resulting methoxy endblocked (or capped) polymer, toluene and water acidified with acetic acid were added, and, after through mixing were allowed to separate, the salt-water mixture was decanted and the toluene and water distilled off. The final (filtered) polymeric product analyzed by weight 1.04% unsaturation (as $C_3H_5$), 0.04% hyroxyl, cloud point 37°C. and viscosity of 576 centistokes.

D. The methyl capped polyoxyalkylene polymer (56.5 g.) so produces was then reacted with 17.3 grams of a hydrosiloxane [analyzing 18.5 cc $H_2$/g. for SiH] at 90°C. in the presence of 32 g. of toluene and 0.8 cc of 10% chloroplatinic acid. There was 1.0 SiH group per 1.0 olefinic group. The reaction proceeded in accordance with the equation:

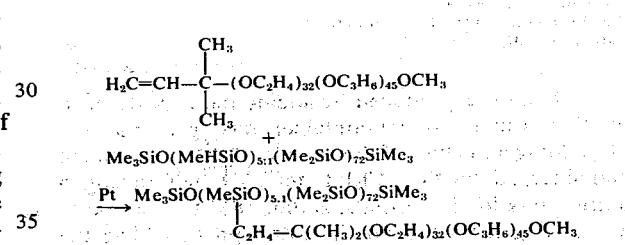

No free SiH could be detected at the end of 1 hour, indicating a complete reaction. Complete reaction was obtained without using an excess of the polyoxyalkylene polymer.

EXAMPLE 2

Ethylene oxide (161.8 lbs.) was charged to a 75 gallon tank and then slowly added to a 75 gallon reactor which contained a mixture of 16,913 g. of 4-methyl-3-hydroxybutene and 153 g. of potassium hydroxide (premixed in a 5-gallon can before charged to the reactor) maintained at a temperature of 90°C. The addition rate was such that the temperature was 100° to 110°C and the pressure was 50 to 55 psig (both controlled automatically). A total of 23 hours was required for the addition of ethylene oxide. Then the contents of the reactor were heated for 6 hours during which time the reactor pressure dropped at a rate of 2 psig per 30 min. A crude polyoxyethylene polymer was produced.

The crude polyoxyethylene polymer prepared above was heated at 100°C and at 10 millimeters of mercury pressure to remove volatile materials to yield a polyoxyethylene polymer having an average molecular weight of 1100, unsaturation (as $C_3H_5$) 4.26% and OH 4.13%. Hcl was added to this polymer in an amount such that a 10% aqueous solution of the polymer had a pH of 5.5. This was done to minimize the SiH + HOC reaction. The acidified polymer (80.1 g.) was reacted with 19.9 g. of the hydrosiloxane $Me_3SiO(Me_2SiO)_{13}(MeSiHO)_{5.5}SiMe_3$ (a stoichiometry of 1.0 SiH group per 1.1 olefinic groups) in the presence of toluene (43 g.) and chloroplatinic acid (0.18 cc of 10% an ethanol-dimethoxy ethylene glycol solution, 50 parts by weight of Pt per million parts by weight of reactants) at 80° to 85°C for 2.5 hrs. The toluene was removed by bubbling nitrogen thru the product to 120°–140°C. The residue was filtered to remove the platinum catalyst. The residue was a block copolymer having the average formula:

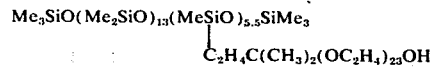

EXAMPLE 3

A polyurethane foams were produced from the following formulation:

| Material | Parts by Weight |
| --- | --- |
| Polyol I | 100 |
| Distilled Water | 4.85 |
| Dimethylethanolamine | 0.35 |
| $CCl_3F$ | 15.0 |
| Stannous Octoate | 0.3 |
| TDI | 105 index |
| Copolymer Solution* | 0.8 |

*A solution containing 55 wt-% of the block copolymer of Example 1 and 45 wt-% of a mixture containing 90 wt-% $C_4H_9O(C_2H_4O)_{11}(C_3H_6O)_{x.4}H$ and 10 wt-% $C_9H_{19}C_6H_4O(C_2H_4O)_{10.5}H$ The foam was produced by adding the copolymer to the Poly1 I in a 1000 ml container, mixing with a spatula, adding a mixture of the water and the amine to the container, adding the $CCl_3F$ to the container, mixing in a drill press for 15 seconds, adding the stannous octoate, mixing for 8 seconds in a drill press, adding the TDI, mixing in a drill press for 7 seconds, pouring the formulation into a mold and curing for 15 minutes at 135°C. Prior to the cure, the temperature was maintained at no higher than 25°C. The foam so produced has a rise of 11.4 inches, a cell count 32 cells per inch and a Nopco Breathability of 4.0.

EXAMPLE 4

When an alcohol having the formula:

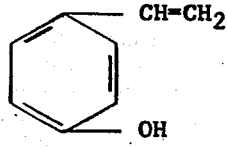

is substituted for 2-methyl-3-buten-2-ol in Example 1 above, the final block copolymer has the average formula:

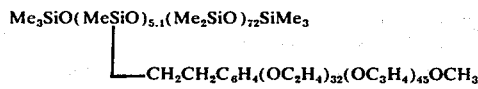

The latter block copolymer is illustrative of a variety of block copolymers of the invention containing the group represented by the formula:

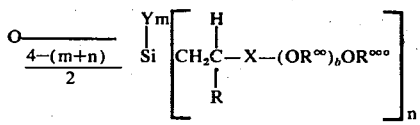

wherein X is a cyclic divalent hydrocarbon group free of aliphatic carbon to carbon multiple bonds (e.g., an arylene group such as the phenylene and tolylene groups or an cycloalkylene groups such as the cyclobutylene and cyclohexylene groups) and the remaining symbols are as defined above. Such block copolymers can also contain groups represented by formula (III).

What is claimed is:

1. A siloxane-polyoxyalkylene block copolymer consisting essentially of:

a. at least one unit having the formula:

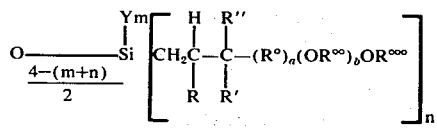

wherein
Y is a monovalent hydrocarbon group free of aliphatic carbon to carbon multiple bonds, $m$ has a value from 0 to 2 inclusive, $n$ has a value from 1 to 3 inclusive, $(m+n)$ has a value from 1 to 3 inclusive, R is hydrogen or a monovalent hydrocarbon group free of aliphatic carbon to carbon multiple bonds, R' and R'' are each monovalent hydrocarbon groups free of aliphatic carbon to carbon multiple bonds, R° is a divalent hydrocarbon group free of aliphatic carbon to carbon multiple bonds, $a$ has a value of 0 to 1, R°° is a alkylene group containing at least two carbon atoms, $b$ has a value of at least 5 and R°°° is —R, —OCNHR, —OCR' or —OCOR' (where R and R' are as defined above); and b. units having the formula:

wherein $p$ has a value from 1 to 3 inclusive and Z is a monovalent hydrocarbon group free of aliphatic carbon to carbon multiple bonds.

2. A block copolymer as defined in claim 1 having the average formula:

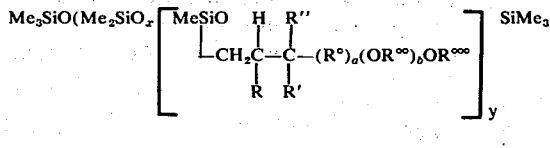

wherein Me is a methyl group, $x$ has a value from 10 to 100, $y$ has a value from 1 to 15 and the remaining symbols are as defined in claim 19.

3. A block copolymer as claimed in claim 1 wherein R is hydrogen, R' and R''are methyl, $a$ is 0, $n$ is 1, Z is methyl and Y is methyl.

4. A block copolymer as claimed in claim 1 wherein R°°° is hydrogen.

5. A block copolymer as claimed in claaim 3 wherein R°°°is hydrogen.

6. A block copolymer as claimed in claim 1 wherein R°°° is alkyl.

7. A block copolymer as claimed in claim 3 wherein R°°° is alkyl.

8. A process for producing a black copolymer as defined in claim 1 which process comprises reacting (1) an olefinic polyoxyalkylene polymer having the average formula:

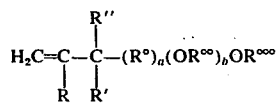

wherein R is hyrogen or a monovalent hydrocarbon group free of aliphatic carbon to carbon multiple bonds, R' and R'' are each manovalent hydrocarbon groups free of aliphatic carbon to carbon multiple bonds, R° is a divalent hydrocarbon group free of aliphatic carbon to carbon multiple bonds, $a$ has a value of 0 to 1, R°° is an alkylene group containing at least to carbon atoms, $b$ has a value of at least 5 and R°°° is —R, —OCNR$_2$, —OCR' or —OCOR' (where R and R' are as defined above); with (2) a hydrosiloxane consisting essentially of:

a. at least one unit having the formula:

wherein $m$, $n$, $(m+n)$ and Y are as defined in claim 1; and b. units having formula (III) of claim 1 in the presence of (3) a catalyst for the addition of SiH to olefinic bonds.

9. A process as claimed in claim 8 wherein the catalyst is a platinum catalyst.

10. A process as claimed in claim 8 wherein the catalyst is chloroplatinic acid.

11. A process as claimed in claim 8 wherein the olefinic polyoxyalkylene polymer and the hydrosiloxane are employed in amounts that provide about one olefinic group per SiH group.

* * * * *

UNITED STATES PATENT OFFICE
CERTIFICATE OF CORRECTION

Patent No. 3,957,843        Dated May 18, 1976

Inventor(s)    E. W. Bennett

It is certified that error appears in the above-identified patent and that said Letters Patent are hereby corrected as shown below:

Col. 1, line 36, after "copolymer", "producct" should read -- product --.

Col. 1, line 41, "SiH" should be -- $\equiv$SiH --.

Col. 2, line 56, after "above as", "an" should be -- a --.

Col. 2, line 62, "tL-butyl" should read -- t-butyl --.

Col. 2, line 68, "toyl" should read -- tolyl --.

Col. 3, line 4, "propylenee" should read -- propylene --.

Col. 3, Formula (V), so much of the formula which reads
$$\left[\begin{array}{c} MeSiO \\ -CH_2 \end{array}\right.$$
should read
$$\left[\begin{array}{c} MeSiO \\ \phantom{-}\mathrel{\text{L}}CH_2 \end{array}\right. --.$$

Col. 3, line 60, after "of", "a" should be --the--.

UNITED STATES PATENT OFFICE
CERTIFICATE OF CORRECTION

Patent No. 3,957,843            Dated  May 18, 1976

Inventor(s)        E. W. Bennett

It is certified that error appears in the above-identified patent and that said Letters Patent are hereby corrected as shown below:

Col. 4, line 68, after "copolymers", "in" should be -- by --.

Col. 7, line 7, "Forming" should be -- Foaming --.

Col. 7, line 22, after "mally-unstable", delete "thermally-unstaable".

Col. 7, line 38, "N,N-diemthylethanolamine" should be -- N,N-dimethylethanolamine --.

Col. 7, line 44, after "Such", "matal" should be -- metal --.

Col. 7, line 67, after "amount", "suficient" should be -- sufficient --.

Col. 8, line 34, after "contains", "are" should be -- a --.

Col. 8, line 56, after "block", "copolymrs" should be -- copolymers --.

Col. 9, line 10, "diisocylanate" should be -- diisocyanate --.

Col. 9, line 50, "mthanol" should be -- methanol --.

Col. 9, line 64, after "distilling the", "ethanol" should be -- methanol --.

Col. 10, line 14, "through" should be -- thorough --.

UNITED STATES PATENT OFFICE
CERTIFICATE OF CORRECTION

Patent No. 3,957,843          Dated May 18, 1976

Inventor(s) E. W. Bennett

It is certified that error appears in the above-identified patent and that said Letters Patent are hereby corrected as shown below:

Col. 10, line 18, "hyroxyl" should be -- hydroxyl --.

Col. 10, line 21, "produces" should be -- produced --.

Col. 10, line 62, "Hcl" should be -- HCl --.

Col. 11, line 31, "Polyl I" should be -- Polyol I --.

Col. 12, Claim 5, after "as claimed in", "claaim" should be -- claim --.

Col. 13, Claim 8, after "A process for producing a", "black" should be -- block --.

Col. 13, Claim 8 (line 18), after "containing at least", "to" should be -- two --.

Signed and Sealed this

Twenty-third Day of May 1978

[SEAL]

Attest:

RUTH C. MASON
Attesting Officer

LUTRELLE F. PARKER
Acting Commissioner of Patents and Trademarks